(12) United States Patent
Caldwell

(10) Patent No.: US 9,359,225 B1
(45) Date of Patent: Jun. 7, 2016

(54) WATER FILTER

(71) Applicant: E. Neal Caldwell, Knoxville, TN (US)

(72) Inventor: E. Neal Caldwell, Knoxville, TN (US)

(*) Notice: Subject to any disclaimer, the term of this patent is extended or adjusted under 35 U.S.C. 154(b) by 0 days.

(21) Appl. No.: 14/669,302

(22) Filed: Mar. 26, 2015

(51) Int. Cl.
| | |
|---|---|
| C02F 9/02 | (2006.01) |
| C02F 1/00 | (2006.01) |
| B01D 29/56 | (2006.01) |
| B01D 36/00 | (2006.01) |
| B01D 24/22 | (2006.01) |
| C02F 9/00 | (2006.01) |
| C02F 3/06 | (2006.01) |
| B01D 36/04 | (2006.01) |
| B01D 36/02 | (2006.01) |

(52) U.S. Cl.
CPC .......... C02F 1/003 (2013.01); B01D 29/56 (2013.01); B01D 36/001 (2013.01); *B01D 24/22* (2013.01); *B01D 36/02* (2013.01); *B01D 36/04* (2013.01); *C02F 3/06* (2013.01); *C02F 9/005* (2013.01)

(58) Field of Classification Search
CPC ............ C02F 1/002; C02F 1/003; C02F 3/06; C02F 9/005; C02F 2307/10; C02F 3/106; B01D 29/56; B01D 24/007; B01D 24/205; B01D 24/22; B01D 36/001; B01D 36/02; B01D 36/04
USPC ................... 210/265, 266, 472, 476
See application file for complete search history.

(56) References Cited

U.S. PATENT DOCUMENTS

| | | | | |
|---|---|---|---|---|
| 103,592 | A | * | 5/1870 | Farson .......................... 210/456 |
| 1,696,487 | A | * | 12/1928 | Jervis ........................... 210/472 |
| 1,861,481 | A | * | 6/1932 | Rabjohn ........................ 210/317 |
| 2,017,456 | A | * | 10/1935 | Gudmundsen ................ 210/284 |
| 3,618,774 | A | | 11/1971 | Delphia |
| 3,823,824 | A | | 7/1974 | Close |
| 4,330,401 | A | | 5/1982 | Boze et al. |
| 4,765,892 | A | | 8/1988 | Hulbert et al. |
| 5,032,261 | A | | 7/1991 | Pyper |
| 5,264,129 | A | | 11/1993 | Simpson et al. |
| 5,562,824 | A | * | 10/1996 | Magnusson ................... 210/266 |
| 5,902,488 | A | | 5/1999 | Prince |
| 5,993,672 | A | | 11/1999 | Manz |
| 6,123,858 | A | | 9/2000 | Manz |
| 6,516,562 | B2 | | 2/2003 | Astle |
| 6,953,525 | B2 | | 10/2005 | LeCraw |
| 6,966,980 | B2 | | 11/2005 | Blackburn |
| 7,744,755 | B2 | | 6/2010 | Miyazaki |
| 8,123,941 | B2 | | 2/2012 | Venville |

(Continued)

FOREIGN PATENT DOCUMENTS

| | | |
|---|---|---|
| EP | 0143586 A2 | 11/1984 |
| GB | 2413292 A | 10/2005 |
| GB | 2413774 A | 11/2005 |

OTHER PUBLICATIONS

International Search Report and Written Opinion, PCT/US2011/040341, Date of mailing Oct. 28, 2011, 27 pages.

(Continued)

*Primary Examiner* — Matthew O Savage
(74) *Attorney, Agent, or Firm* — Luedeka Neely Group, PC

(57) ABSTRACT

A liquid filtration system, including an inclined filter support and a chimney, the chimney having an entrance adjacent an upper portion of the filter support; and a sheet filter supported in an inclined orientation by the inclined filter support. Air trapped by the sheet filter during use of the filtration system travels along a path corresponding to the inclined orientation sheet filter and into the entrance of the chimney for escape.

7 Claims, 12 Drawing Sheets

(56) References Cited

U.S. PATENT DOCUMENTS

| | | | |
|---|---|---|---|
| 2008/0308484 A1 | 12/2008 | Deb et al. | |
| 2010/0072118 A1 | 3/2010 | Manz | |
| 2011/0008317 A1* | 1/2011 | De Leij et al. | 424/125 |
| 2011/0303589 A1 | 12/2011 | Kuennen et al. | |
| 2011/0303623 A1* | 12/2011 | Caldwell et al. | 210/807 |

OTHER PUBLICATIONS

CAWST Center for Affordable Water and Sanitation Technology, http://www.cawst.org, Accessed Aug. 27, 2009.

HydrAid BioSand Water Filter, Why HydrAid, http://www.hydraid.org, Accessed Aug. 27, 2009.

Buzunis, Byron James, Intermittently Operated Slow Sand Filtration: A New Water Treatment Process, The University of Calgary, Department of Civil Engineering, Mar. 1995.

Manz, Dr. David H., New Horizons for Slow Sand Filtration, Eleventh Canadian National Conference and Second Policy Forum on Drinking Water and the Biennial Conference of the Federal-Provincial-Territorial Committee on Drinking Water, Promoting Public Health through Safe Drinking Water, Apr. 3-6, 2004, Calgary, Alberta, pp. 682-692.

ONIL Water Purifier System brochure, Helps International, http://www.helpsinternationals.com.

Huisman, L., et al., Slow Sand Filtration, World Health Organization, 1974.

Visscher, J.T., et al., Slow Sand Filtration for Community Water Supply, International Reference Centre for Community Water Supply and Sanitation, Technical Paper No. 24, The Hague, The Netherlands, 1987.

* cited by examiner

WATER FILTER

FIELD

This disclosure relates to the field of water purification devices. More particularly, this disclosure relates to a slow/intermittent media filter that purifies polluted water by flowing through sand in a manner that achieves greater purity and permits simpler and more effective maintenance than existing filters.

BACKGROUND

A major issue that persists in underdeveloped areas is both water quality and quantity. Slow and/or intermittent media (usually sand) filters are a good choice for such areas in that they are generally of simple and inexpensive construction and do not require the use of electricity, chemicals or other materials that require replacement. However, conventional slow sand filters still desire improvement in that they do not adequately eliminate many bacteria and are not user friendly by illiterate and unsophisticated peoples due to their maintenance requirements.

The present disclosure advantageously provides improved slow and/or intermittent media filter devices having improved construction and which offer simplified maintenance as compared to conventional slow sand filters. The filters are of low cost and easily used so that the masses in undeveloped countries may have better access to cleaner water. The filters are also advantageously configured to include a sediment tray and to bleed off air so as to avoid disruptions caused by air to the rate of filtration.

SUMMARY

The above and other needs are met by a filtration system which, in one aspect, includes an inclined filter support and a chimney, the chimney having an entrance adjacent an upper portion of the filter support. A sheet filter is supported in an inclined orientation by the inclined filter support.

Liquid to be treated passes through the sheet filter supported by the filter support, and air trapped by the sheet filter during use of the filtration system travels along a path corresponding to the inclined orientation sheet filter and into the entrance of the chimney for escape.

In another aspect, the filtration system includes a treated liquid container and a liquid treatment container located substantially within the treated liquid container. The liquid treatment container is configured to receive untreated liquid and to treat the untreated liquid to yield treated liquid that is passed to the treated liquid container for storage and/or dispensing;

The treated liquid container includes a container having a bottom and a sidewall extending upwardly from the bottom. The liquid treatment container includes a bottom having a drain, an upper section configured to receive a volume of liquid to be treated, and a particulate filter medium containing section within the liquid treatment container below the upper section and adjacent the bottom.

A filter tray is located within the upper section of the liquid treatment container and above the particulate filter medium containing section. The filter tray includes an inclined filter support and a chimney, the chimney having an entrance adjacent an upper portion of the filter support. A sheet filter is supported in an inclined orientation by the inclined filter support.

Liquid to be treated passes through the sheet filter supported by the filter tray, through the particulate filter medium, and exits the inner liquid treatment container to provide clean liquid stored within a lower portion of the outer treated liquid container. Air trapped by the sheet filter during use of the filtration system travels along a path corresponding to the inclined orientation sheet filter and into the entrance of the chimney for escape.

Filters according to the disclosure advantageously simplify filtration of water, achieving greater purity, and have simplified maintenance requirements and avoid shortcomings associated with conventional filters.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
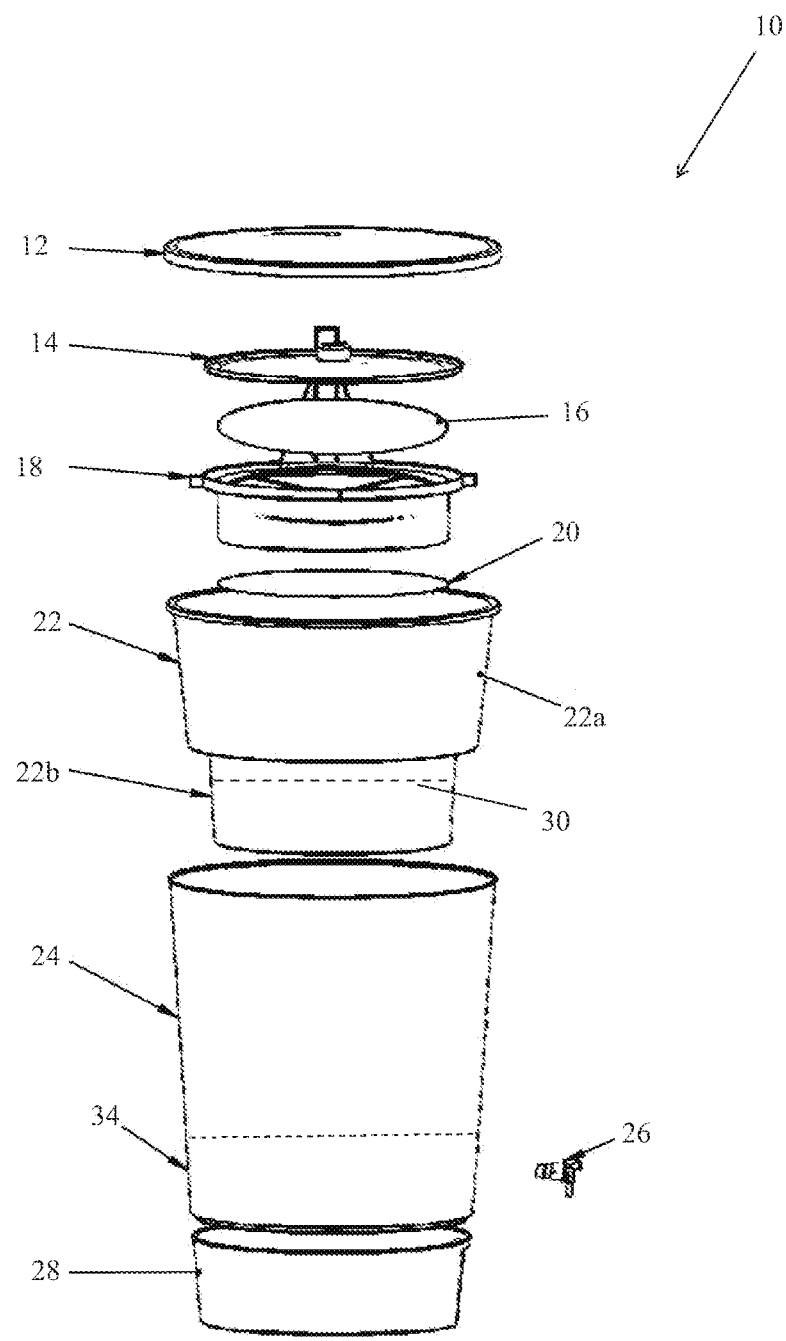
FIG. 1 is an exploded perspective view of a water treatment system according to the disclosure.
Figure 2:
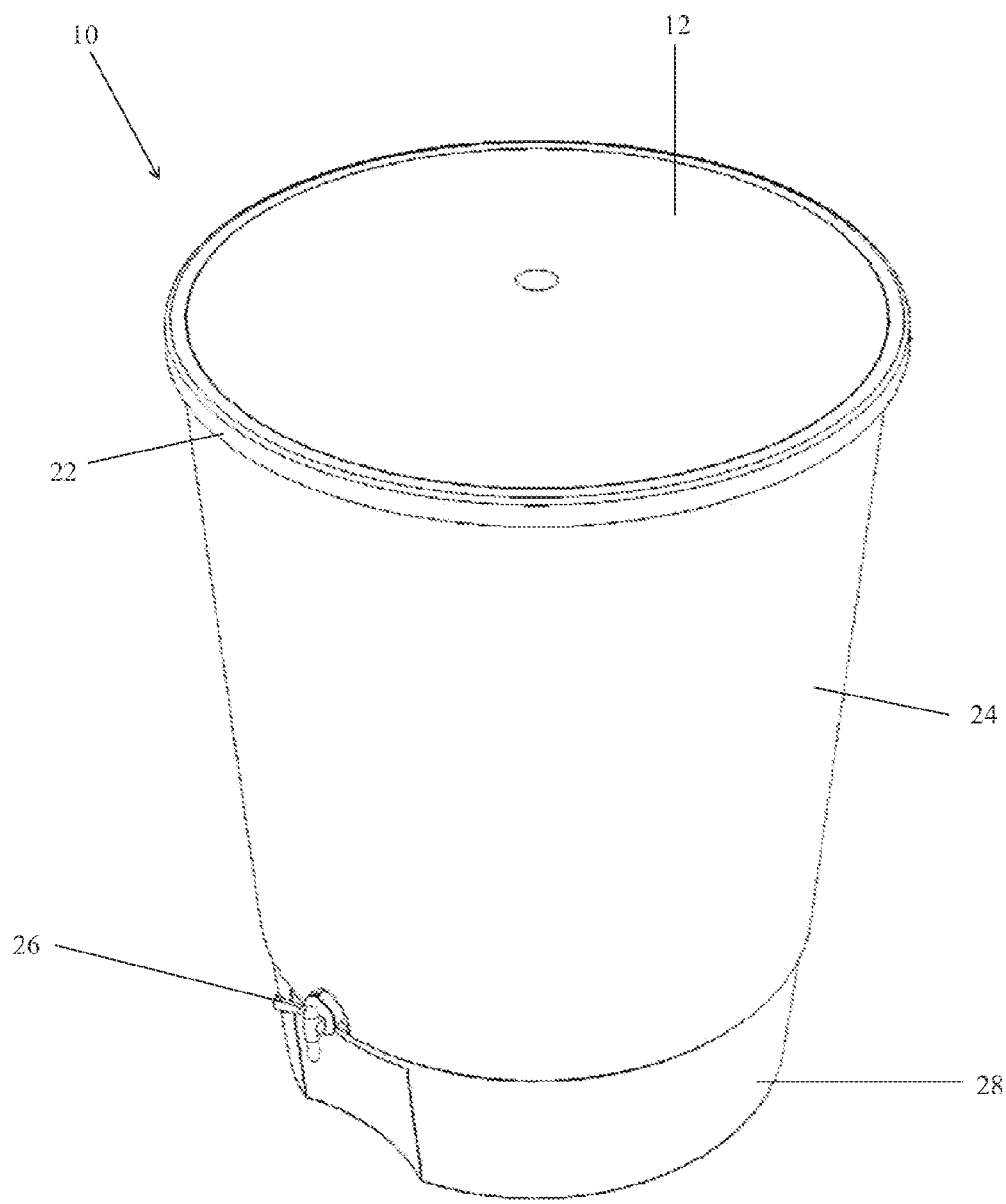
FIG. 2 is an assembled exterior view of the water treatment system of FIG. 1.

With reference to the drawings, the disclosure relates to a slow media filter 10 configured for removing dirt, sticks, microorganisms, and bacteria from polluted input water so that output water from the filter 10 is significantly cleaner and purer than the input water. The filter 10 is also advantageously configured to bleed off air so as to avoid disruptions caused by air to the rate of filtration.

The filter 10 includes a lid 12, a sediment filter 14, a sheet filter 16, a filter tray 18, a sheet sand separator 20, an inner water treatment container 22 having an upper portion 22a and a lower portion 22b, an outer treated water container 24, a spigot 26, and a riser 28. A particulate filter medium, such as sand 30, is also utilized in the filter system 10.

In basic operation, water to be treated is first poured onto the sediment filter 14. The sediment filter 14 allows solids of all sizes in the water to be treated to settle. This includes twigs, debris, and other large and fine particulate matter. This particulate matter settles and collects onto the surface of the sediment filter 14 for subsequent removal, such as by dumping, wiping and the like. In use of the filter, water tends to travel by paths of least resistance and leaks through the edges of the filter 14 and the raised center of the filter 14.

After traveling past the sediment filter 14, water passes through the sheet filter 16 supported by the filter tray 18, through the sand 30 and the sheet sand separator 20, and exits the inner water treatment container 22 via a tube 32 to provide clean water 34 stored within a lower portion of the outer treated water container 24. The clean water 34 may be removed via the spigot 26. The filter tray 18 is configured to bleed off any air trapped by the sheet filter 16 to avoid a reduction of flow rate through the filter 10 that would occur if the air were not removed. It will be understood that liquids other than water may be filtered using the filter 10.

Figure 7:
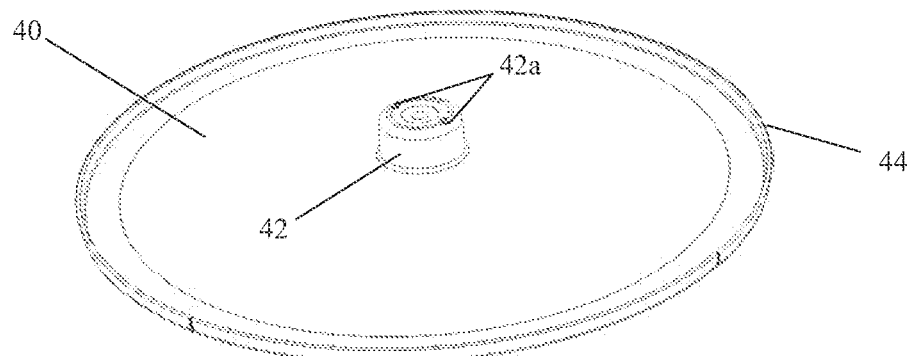
FIGS. 7 and 8 show a component of the water filter system of FIG. 1.
Figure 8:
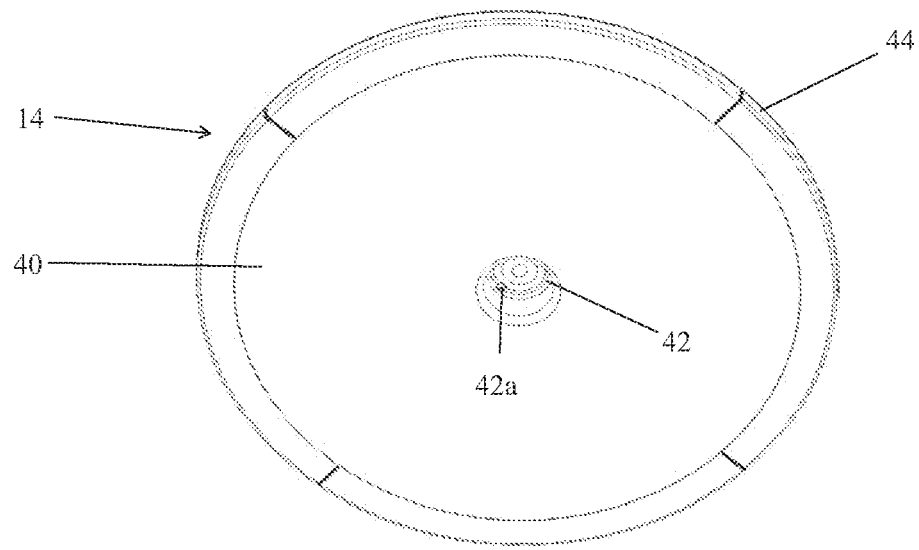
Figure 9:
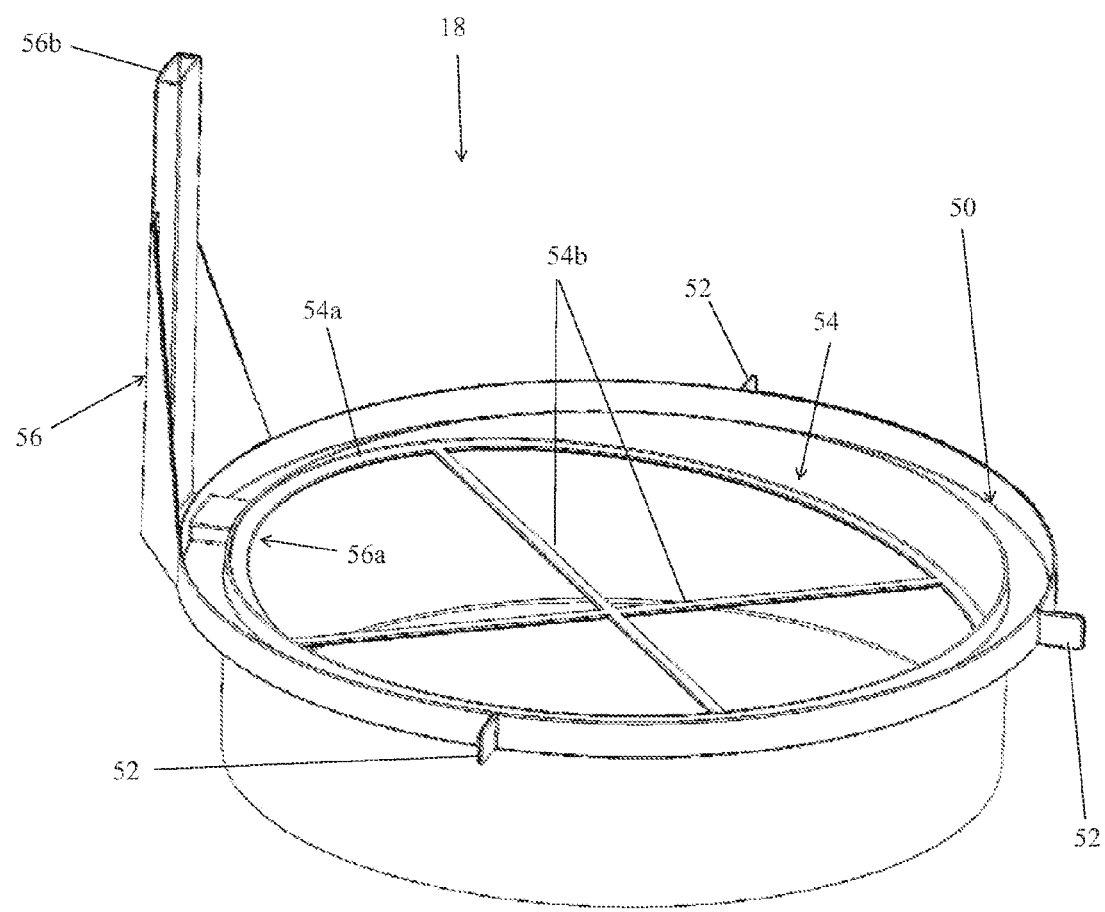
FIGS. 9-12 show a component of the water filter system of FIG. 1.
Figure 10:
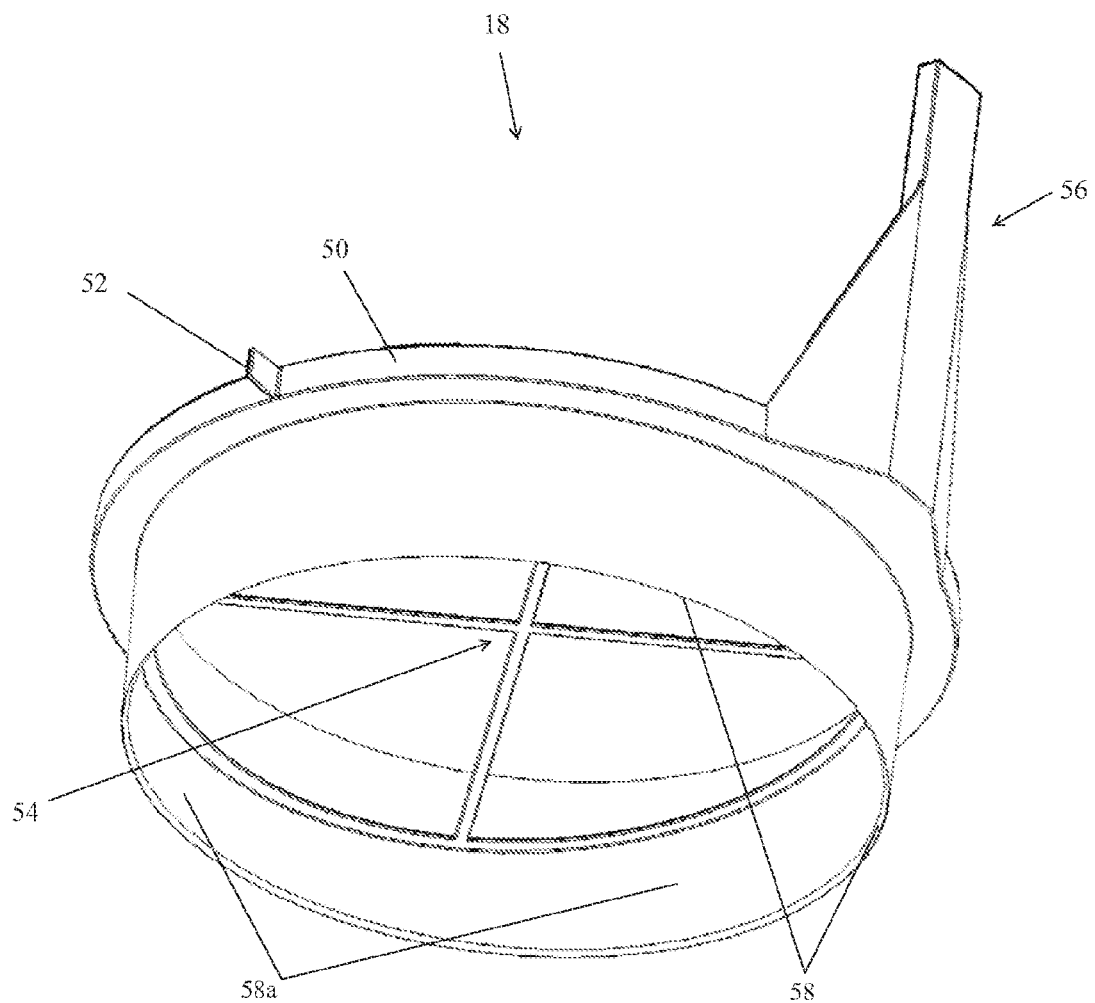
Figure 11:
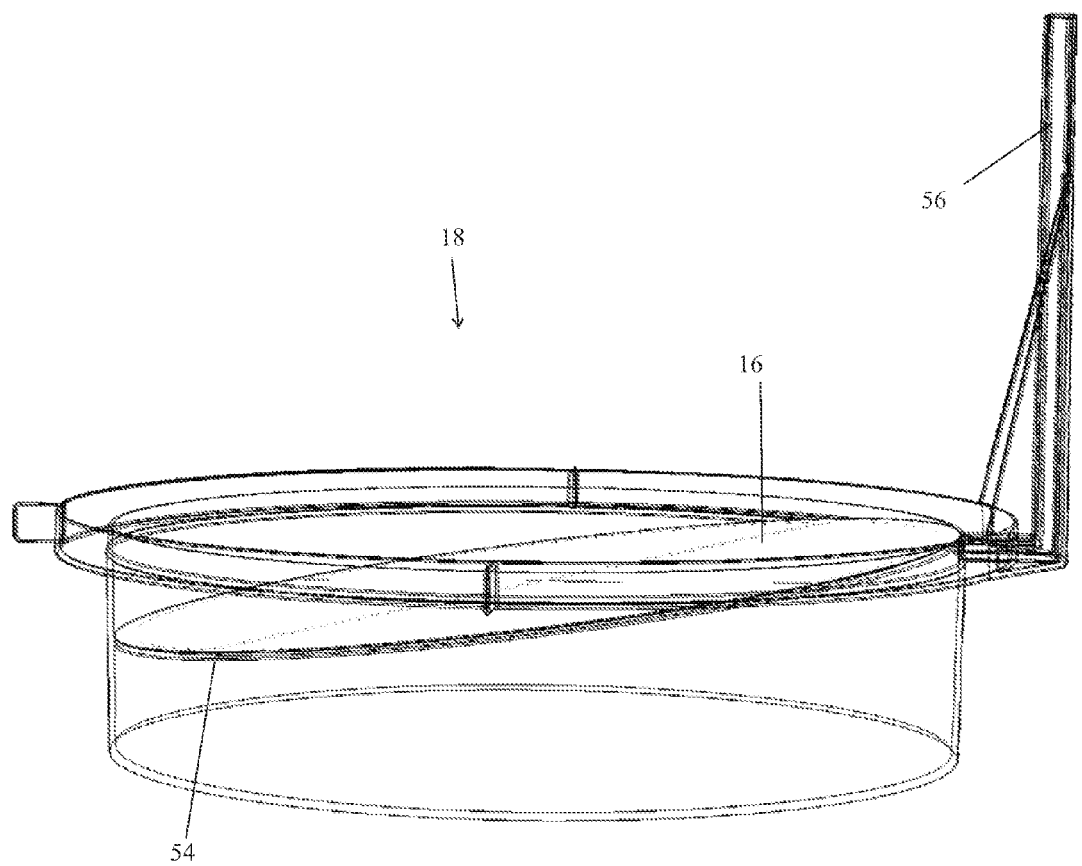
Figure 12:
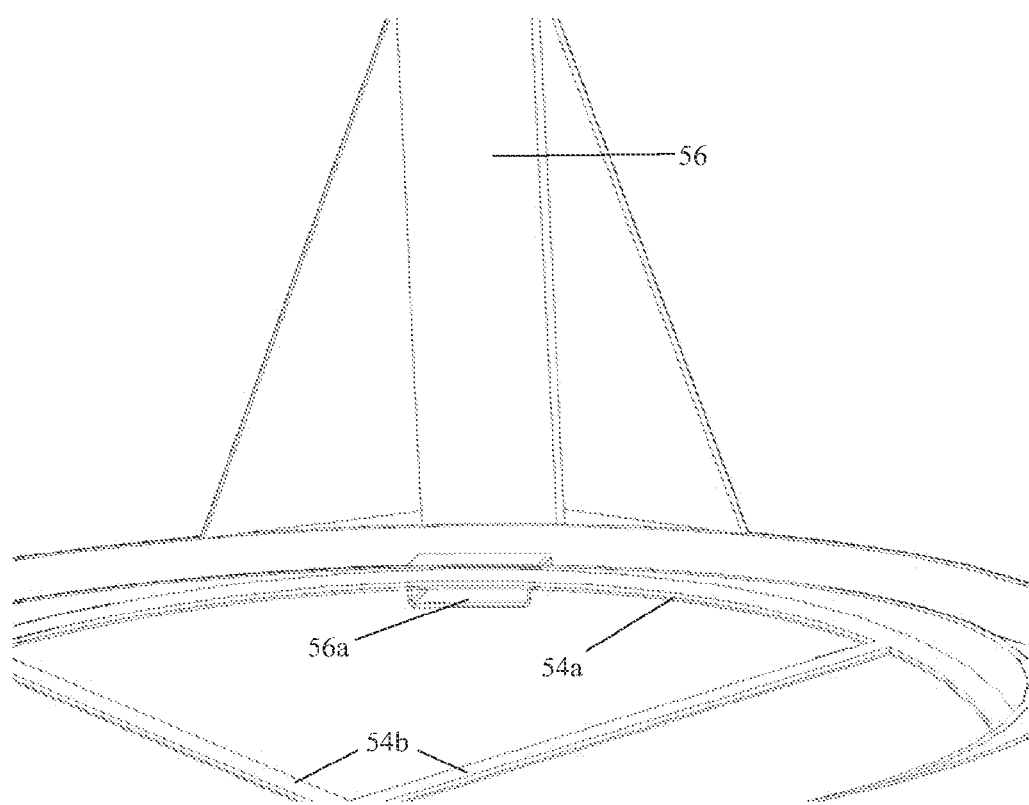

With additional reference to FIGS. 7 and 8, the sediment filter 14 is configured as a solid surface 40 shaped to inhibit the passage of water therepast and to provide a surface onto which solids may settle and collect. A central projection 42 rises from the solid surface 40. The projection 42 includes one or more apertures 42a at an upper portion thereof to permit water to pass through the sediment filter 14 at a level above the collected solids. The apertures 42a may be circular or slotted or otherwise permeable portions defined on the solid surface 40 to provide passages for water to pass. Water also tends to travel past the perimeter edges of the filter 14. The sediment filter 14 is configured to fit onto the top of the filter tray 16, and includes a raised perimeter rim 44 configured to be fittingly received by filter tray 16. When solids have accumulated onto the sediment filter 14, the sediment filter 14 is easily removed and shaken or the like for cleaning.

Water passing through the apertures 42a of the sediment filter 14 passes through the sheet filter 16 supported by the filter tray 18. The sheet filter 16 may be provided as by a polymeric sheet filter material or the like filter cloth, preferably welded or otherwise affixed to a plastic ring or frame. The sheet filter 16 may be easily removed for cleaning or replacement. As described more fully below, the sheet filter 16 is supported at an angled orientation by the filter tray 18 and the filter tray 18 is configured to facilitate air trapped by the sheet filter 16 to escape.

With additional reference to FIGS. 9-12, the filter tray 18 has an upper rim 50 configured to receive the perimeter rim 44 of the sediment filter 14. A plurality of projections 52 extend outwardly from the upper rim 50. The projections 52 seat the filter tray 18 at the juncture of the upper portion 22a and the lower portion 22b of the inner water treatment container 22. The filter tray 18 has an open top and an open bottom spaced apart from one another, with the bottom of the filter tray 18 being located at or above an upper portion of the sand 30 in the assembled filter 10. An interior filter support 54 is located between the top and the bottom of the filter tray 18.

The filter support 54 provides a permeable support onto which the sheet filter 16 is supported for water to travel therethrough. In this regard, the filter support 54 may be provided as by a circumferential rim 54a having crosspieces 54b extending therefrom. The filter support 54 is preferably angled to support the sheet filter 16 at an inclination of from about 30 degrees to about 60 degrees. It has been observed that air can become trapped by the sheet filter 16, which is disadvantageous to filtering. Accordingly, the inclination of the filter sheet 16 provided by the filter support 54 provides a path by which air can travel upwardly without restriction along the underside of the sheet filter 16. This path is joined to a chimney 56 topping out above the maximum height of the input water for escape of the air from the sheet filter 16.

An uppermost rim 56a of the filter support 54 is adjacent and in flow communication with an entrance 56a of the chimney 56 of the filter tray 18. The chimney 56 provides an elongate enclosed channel for air entrained in water and trapped by the sheet filter 16 to escape. Thus, air trapped by the filter sheet 16 travels upwardly along the lower surface of the filter sheet 16 and enters the chimney 56 via the entrance 56a. The air travels upwardly through the chimney to an exit 56b located above any water within the filter 10 and exits the chimney 56.

The filter tray 18 also includes a lowermost rim 58 spaced a distance below the filter support 54 by an extended sidewall 58a. This structure enables the lowermost rim 58 to be embedded into the sand 30 and provide a sealing feature. Thus, any water that might bypass and travel around the filter tray 18 is stopped by the interface of the exterior of the rim 58 and the sand 30. Over time, it has been observed that such flow paths that may permit water to travel around the filter tray 18 tend to clog with fine particulate matter so that such travel is substantially avoided. The rim 58 and the extended sidewall 58a also advantageously allow the volume under the filter support 54 to serve as a reservoir for relatively particulate free water to reside when the filter tray 18 is removed and inverted for backwashing and cleaning of the sheet filter 16.

Figure 13:
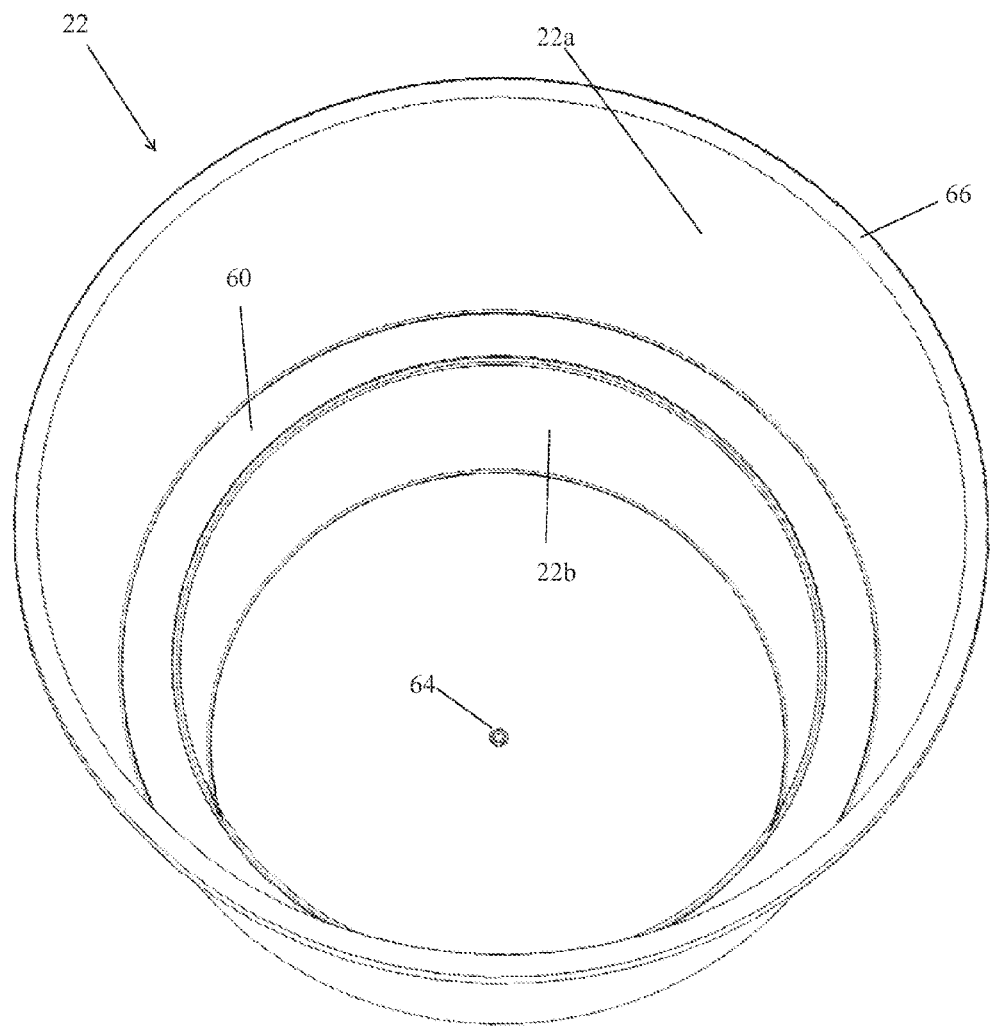
FIGS. 13 and 14 show an inner water treatment container component of the water filter system of FIG. 1.
Figure 14:
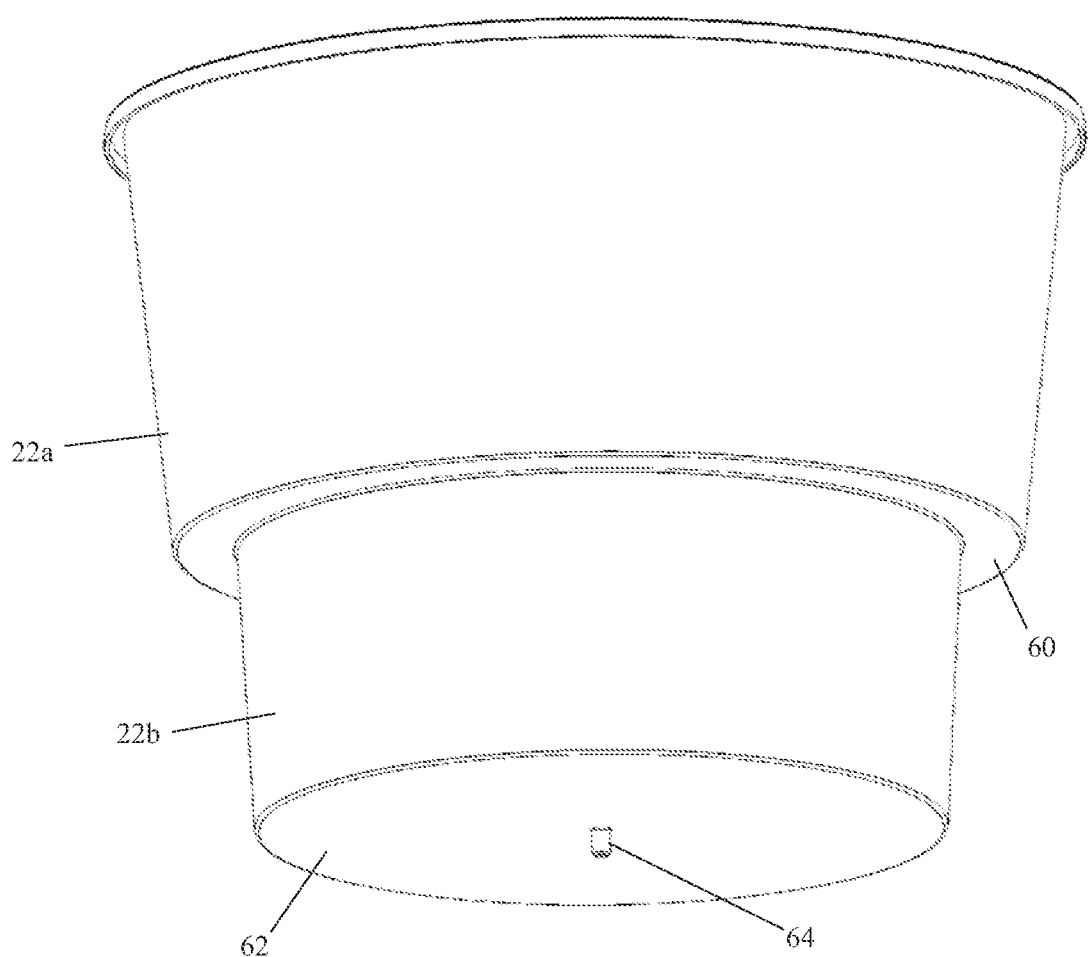

With reference now to FIGS. 13 and 14, the inner water treatment container 22 provides a ledge 60 located at the juncture of the upper section 22a and the lower section 22b, such that the lower section 22b has a reduced diameter relative to the upper section 22a. The uppermost end of the inner water treatment container 22 is open, and a closed bottom 62 is defined at the lowermost end of the lower section 22b. A drain 64 is centrally located on the bottom 62 for travel of filtered water out of the inner water treatment container 22.

Figure 4:
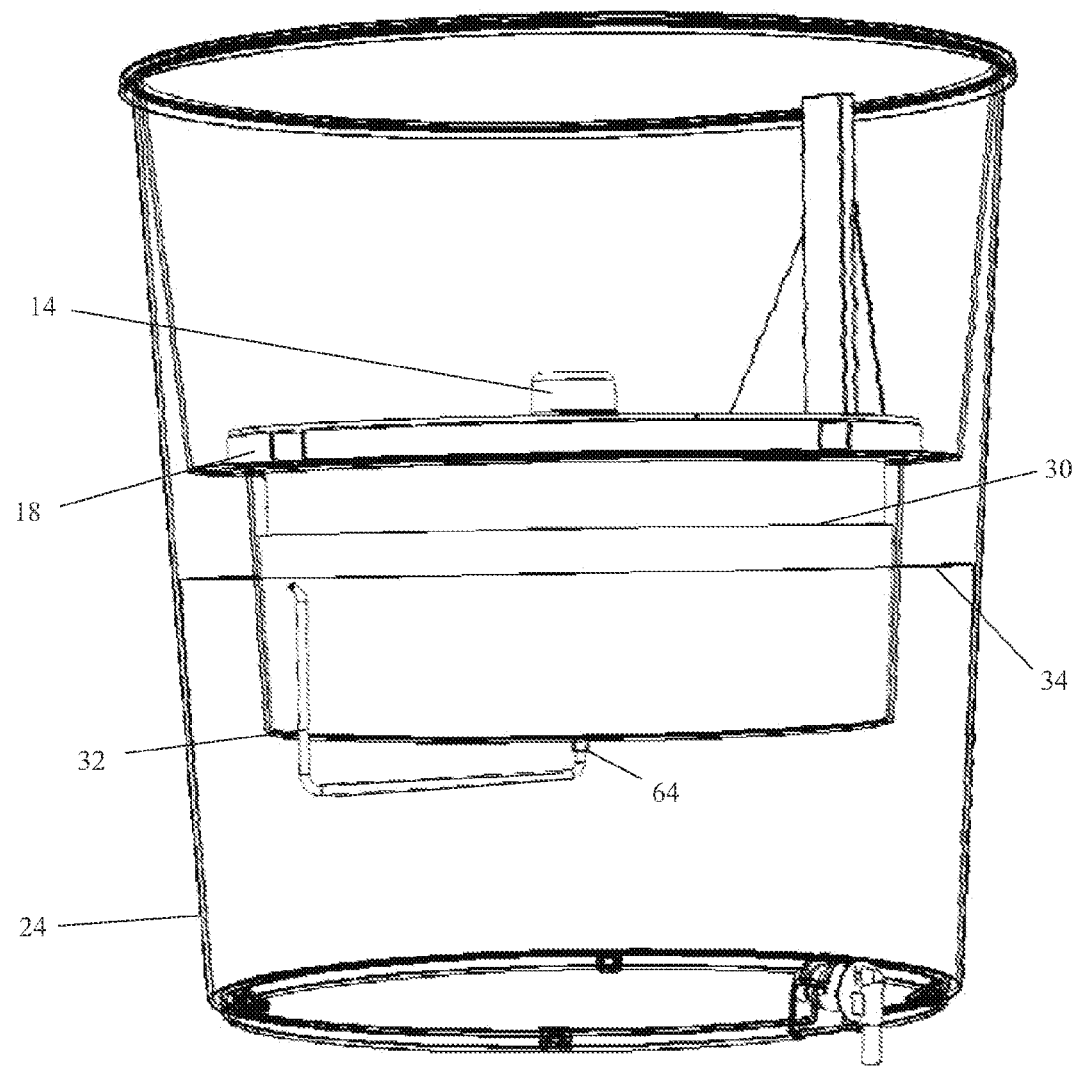
Figure 5:
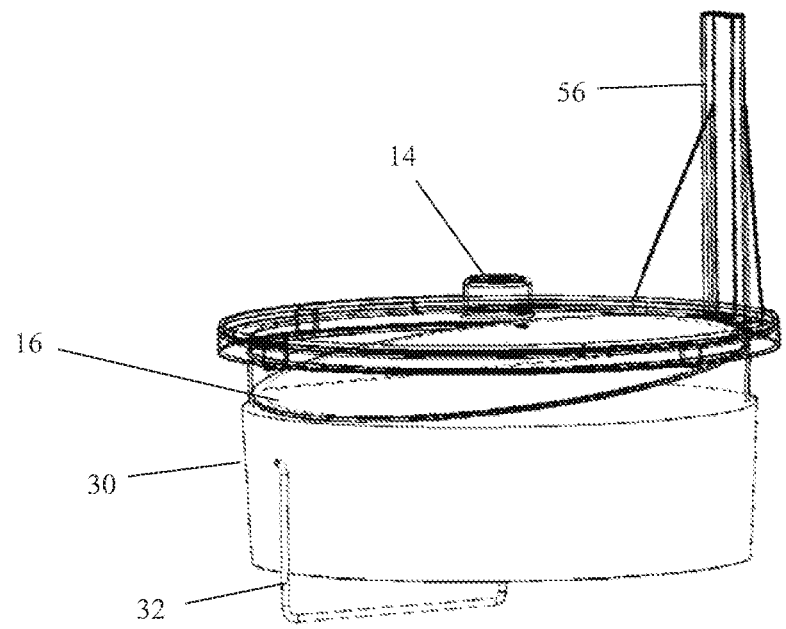
Figure 6:
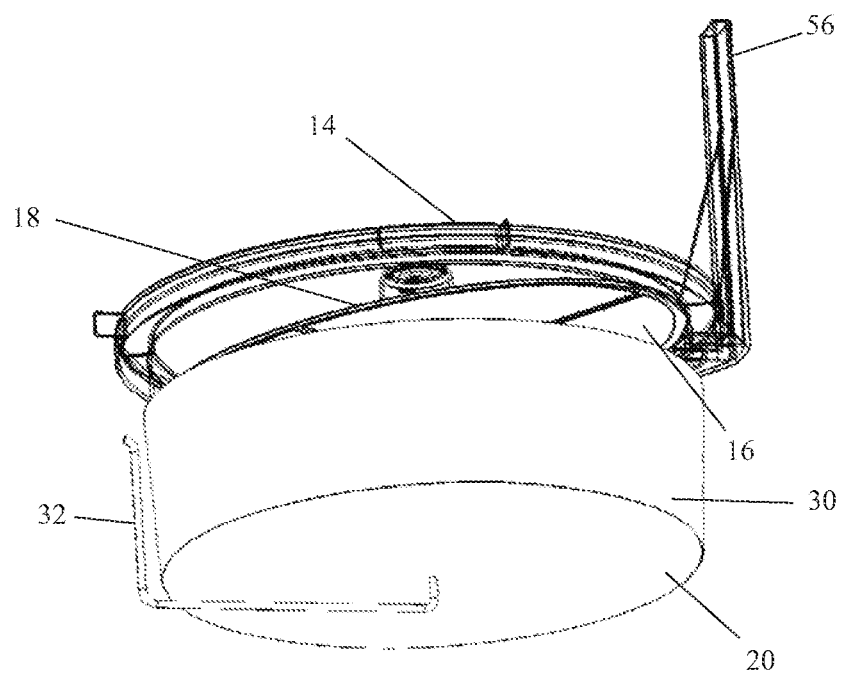

As seen in FIG. 4, the ledge 60 cooperates with the upper rim 50 of the filter tray 18 to support the filter tray 18. This change in diameter of the inner water treatment container 22 also facilitates removal of the sediment filter 14 and the filter tray 18, as the structure avoids water becoming trapped by the filter tray 18. The change in diameter facilitates the passage of water around the edges during lifting to facilitate lifting.

The sheet sand separator 20 is placed on the bottom 62 and the sand 30 is placed thereon within the lower section 22b. The sheet sand separator 20 is configured to inhibit sand from passing through the drain 64. The bottom 62 which is desirably textured so that water passing though the separator 20 may easily find its way to the drain 64 even from the outside edge. The texture of the bottom 62 enables water to travel substantially unrestricted at the flow rates encountered, with sufficient elevation changes so that the sheet filter 16 depress and stifle flow in an area. The texture of the bottom 62 also opens up space at the perimeter of the separator 20 as water flow increases at the center of the separator 20. In addition, the outside edge of the bottom 62 is preferably not textured so that the outside edge of the separator 20 can provide a perimeter sealing feature to inhibit loss of sand at the perimeter.

The tube 32 connects to the drain 64 opposite the bottom 62 and extends upwardly from the drain 64 to a location substantially commensurate with the highest water level of filtered water to be produced by the filter 10. This highest water level is desirably selected to be a location below the uppermost surface of the sand 30. A support rim 66 is located at the uppermost end of the inner water treatment container 22 for hanging the inner water treatment container 22 inside of the outer treated water container 24.

The outer treated water container 24 is configured to support the inner water treatment container 22 and to provide storage space for filtered water. The outer treated water container 24 is larger in height and volume than the inner water treatment container 22 and includes an upper edge onto which the support rim 60 is received. The bottom of the outer treated water container 24 includes connectors for attaching the outer treated water container 24 to the riser 28. Screws may be utilized with the connectors for attachment of the riser and in such a manner to avoid penetration of the screws that would permit leakage. Preferably one-way screws are utilized to deter theft.

Figure 3:
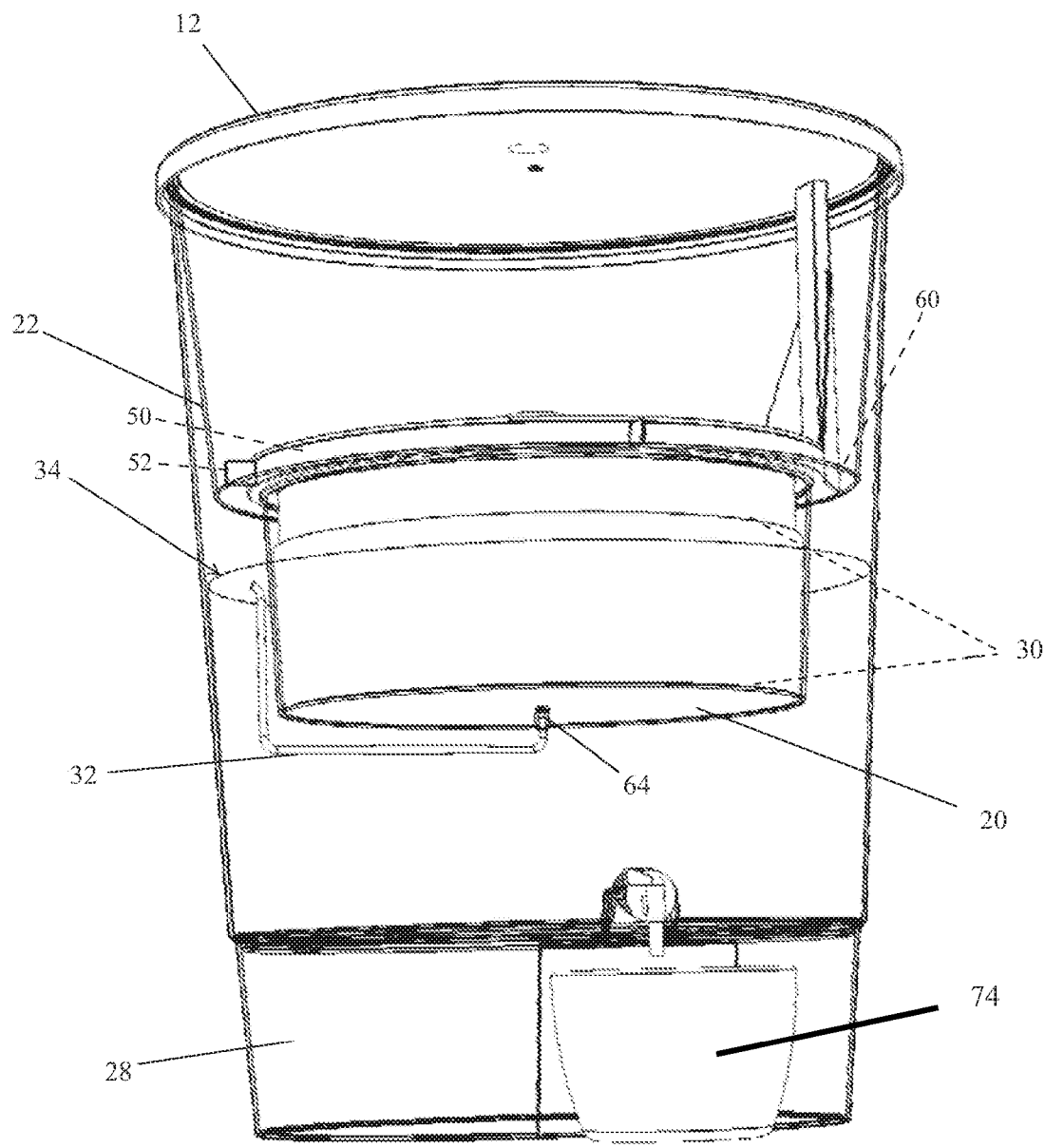
FIGS. 3, 4, 5, and 6 are partially assembled views of the water filter system of FIG. 1, with some components shown transparent.

The riser 28 serves to space the bottom of the outer treated water container 24 above the supporting surface, such as the ground, to facilitate retrieval of filtered water from the filter 10 via the spigot 26. As shown in FIG. 3, the riser 28 enables the bottom of the outer treated water container 24 to be elevated so that a bowl 74 or other vessel may be located below the spigot 26. The riser 28 may be constructed with a bottom configured to contain concrete, gravel, soil, and the like for adding weight to deter tipping over and to deter theft.

Accordingly, it will be appreciated that the filter 10 is advantageously configured to filter liquids, such as water, to remove dirt, sticks, microorganisms, and bacteria from input water so that output water from the filter 10 is significantly cleaner and purer than the input water. The filter 10 is also advantageously configured to bleed off air so as to avoid disruptions caused by air to the rate of filtration.

The filter 10 is also advantageously configured to achieve three levels of successive solids removal. For example, the sediment tray 14 removes large and heavy items as well as even trapping fines as the input water resides above the sediment tray typically for 12 hours during which time even fines settle onto the tray. These solids may be disposed of by simply lifting (preferably when water has dropped below the tray 14) and dumping and/or wiping clean. In addition, the filter support 54 carries the filter 16 which prevents most fines from passing therethrough and can be lifted out to wipe or brush the fines away from the top surface, or fines may be further removed by backwashing with the cleaned water by turning upside down and allowing the clean water flowing to remove remaining fine solids. Furthermore, the sand 30 filters solids that make their way to the sand surface (typically the finest of the fines). These fines typically reside in the top inch of the sand and are most easily removed when at least an inch of water remains above the sand. The top 4 inch of sand is brushed-up over the entire surface so that the ultra-fines become once again suspended in the water. The cloudy water is then scooped up and removed taking the fines along with it. The sand surface is then restored close to its original composition and full flow is thereby restored.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A liquid filtration system for use with a particulate filter medium, comprising:
    a treated liquid container and a liquid treatment container located substantially within the treated liquid container, the liquid treatment container being configured to receive untreated liquid for treatment therein and to yield treated liquid that is passed to the treated liquid container for storage and/or dispensing;
    the treated liquid container comprising a container having a bottom and a sidewall extending upwardly from the bottom;
    the liquid treatment container comprising a bottom having a drain, an upper section configured to receive a volume of liquid to be treated, and a particulate filter medium containing section within the liquid treatment container below the upper section and adjacent the bottom;
    a filter tray located within the upper section of the liquid treatment container and above the particulate filter medium containing section, the filter tray including an upper rim, an inclined filter support having an upwardly facing surface, and a chimney having an entrance, wherein the upper rim defines a plane that is, in use, oriented horizontally, wherein the upwardly facing surface of the filter support defines a plane that is inclined at an angle of inclination of from about 30 degrees to about 60 degrees relative to the plane of the upper rim, and wherein the entrance to the chimney is positioned below an uppermost portion of the upwardly facing surface of the filter support; and
    a sheet filter supported on the upwardly facing surface of the inclined filter support,
    wherein, liquid to be treated passes through the sheet filter supported by the filter tray, through the particulate filter medium, and exits the liquid treatment container to provide clean liquid stored within a lower portion of the treated liquid container, and air trapped by the sheet filter during use of the filtration system travels along a path corresponding to the inclined orientation sheet filter and into the entrance of the chimney for escape.

2. The system of claim 1, further comprising a sheet filter between the particulate filter medium and the bottom of the liquid treatment container to inhibit passage of the particulate filter medium through the drain.

3. The system of claim 1, further comprising a tube connecting between the drain and the interior of the treated liquid container to release treated liquid into the treated liquid container at a location elevated from the drain.

4. The system of claim 1, further comprising a sediment filter located above the filter tray, the sediment filter comprising a solid surface shaped to inhibit the passage of liquid therepast and to provide a surface onto which solids within liquid to be treated may settle and collect, the sediment filter further including a projection rising from the solid surface and having one or more apertures at an upper portion thereof to permit liquid to pass through the sediment filter at a level above the collected solids.

5. The system of claim 1, wherein the liquid comprises water and the clean liquid comprises drinking water.

6. The system of claim 1, wherein the particulate filter medium comprises sand.

7. A liquid filtration system, comprising:
    a filter tray including an upper rim, an inclined filter support having an upwardly facing surface, and a chimney having an entrance, wherein the upper rim defines a plane that is, in use, oriented horizontally, wherein the upwardly facing surface of the filter support defines a plane that is inclined at an angle of inclination of from about 30 degrees to about 60 degrees relative to the plane of the upper rim, and wherein the entrance to the chimney is positioned below an uppermost portion of the upwardly facing surface of the filter support; and
    a sheet filter supported on the upwardly facing surface of the inclined filter support,
    wherein, liquid to be treated passes through the sheet filter supported by the filter support, and air trapped by the sheet filter during use of the filtration system travels along a path corresponding to the inclined orientation sheet filter and into the entrance of the chimney for escape.

* * * * *